May 9, 1950  J. E. HOOVER  2,507,252
LOADING AND UNLOADING MEANS FOR TRAILERS
Filed May 6, 1946  2 Sheets-Sheet 1
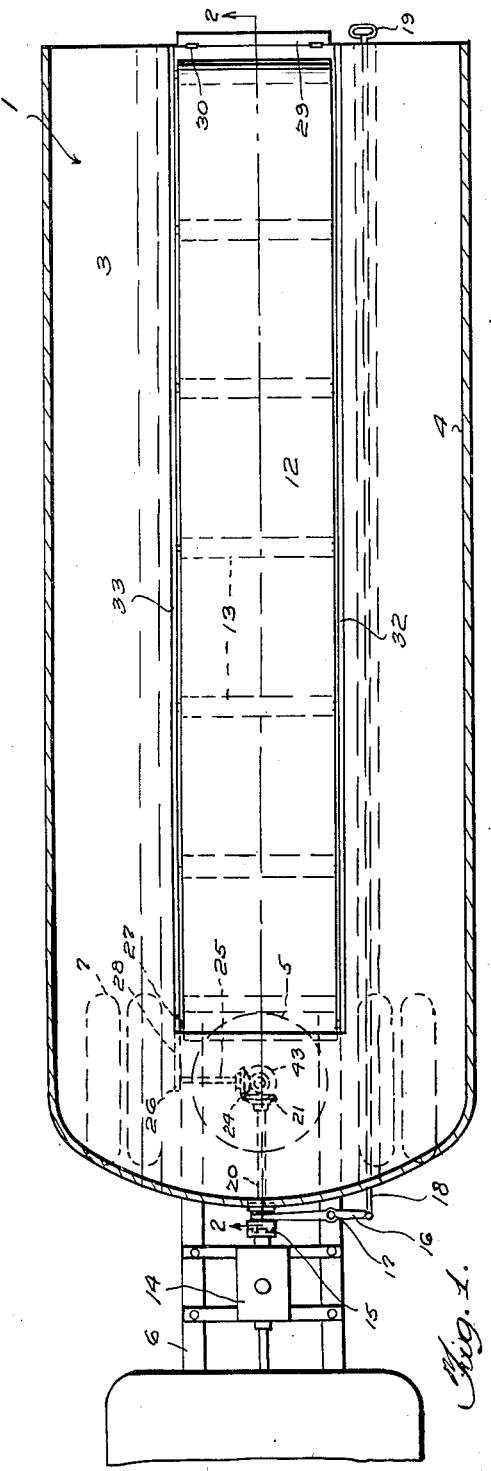
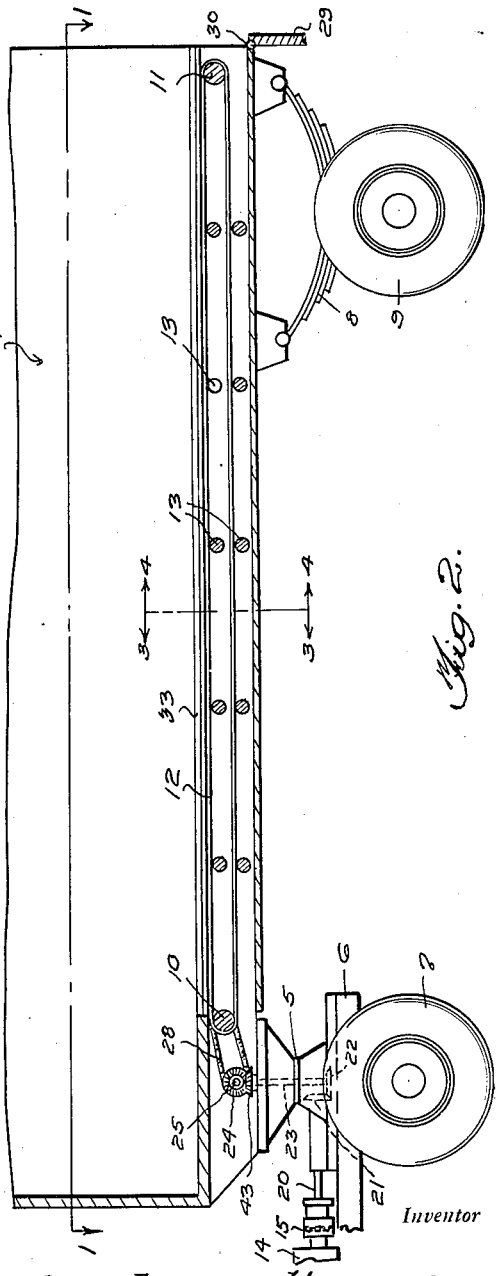
Inventor
John Edward Hoover,
By Clarence A. O'Brien
and Harvey B. Jacobson
Attorneys

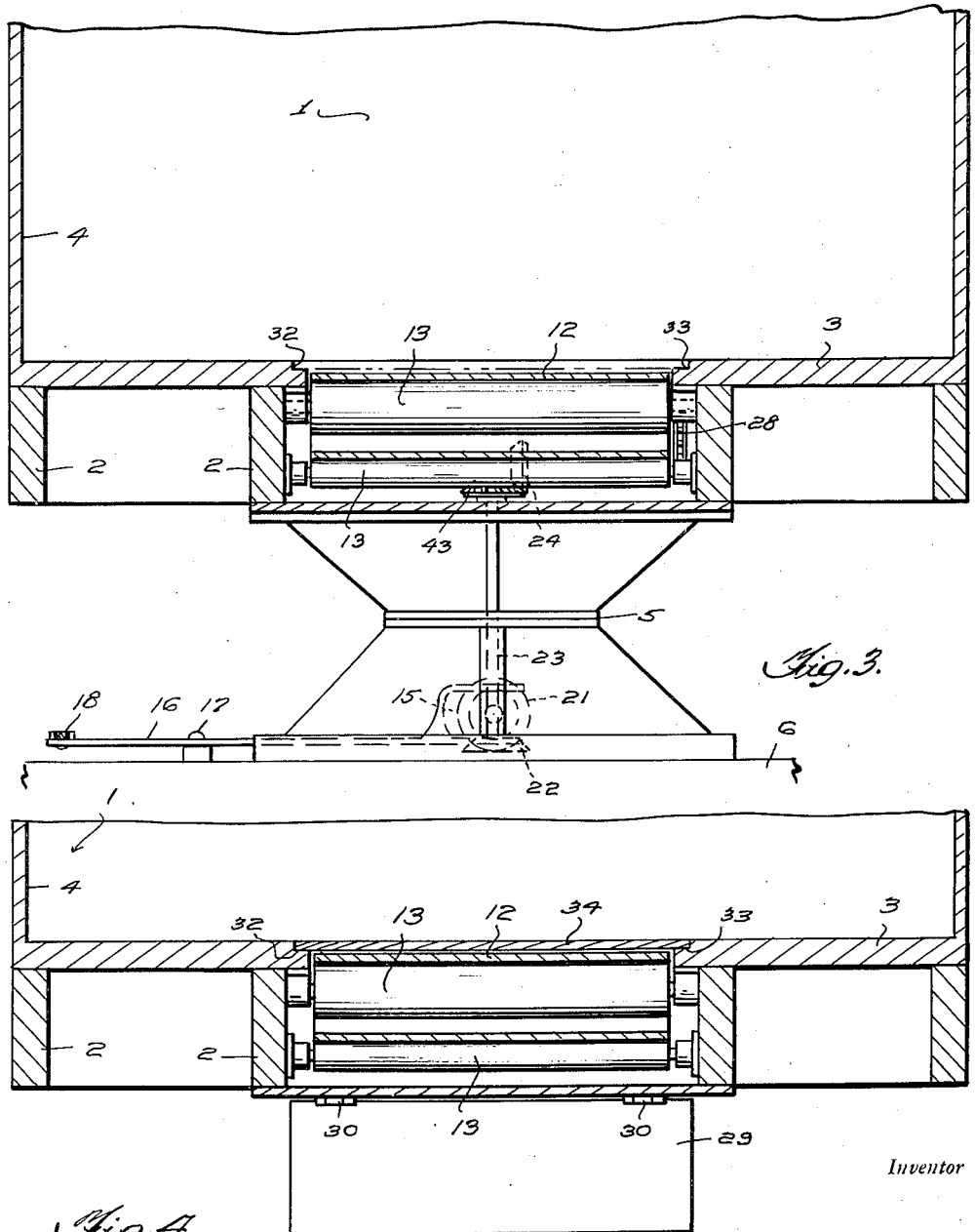

Patented May 9, 1950

2,507,252

UNITED STATES PATENT OFFICE 2,507,252

LOADING AND UNLOADING MEANS FOR TRAILERS

John Edward Hoover, Mansfield, Ohio

Application May 6, 1946, Serial No. 667,565

3 Claims. (Cl. 214—83.36)

This invention relates to improvements in means for loading and unloading trailers.

An object of the invention is to provide an improved power take-off driven conveyor located centrally and extending longitudinally of a trailer whereby the loading and unloading of the trailer may be accomplished in a much shorter time than possible by regular hand loading.

Another object of the invention is to provide an improved power take-off driven conveyor located centrally and longitudinally of a trailer together with a two-way clutch, whereby the conveyor may be operated in a forward direction for loading the trailer and may be operated in a rearward direction for unloading the trailer.

A further object of the invention is to provide an improved power take-off driven conveyor located centrally and longitudinally of a trailer together with a two-way clutch, whereby the conveyor may be operated in a forward direction for loading the trailer, and may be operated in a rearward direction for unloading the trailer, and means for supporting a plurality of steel plates in position above said conveyor, said plates being laid down as the trailer is being loaded from the front end to the rear end, and said plates being picked up and removed as the trailer is being unloaded from the rear end toward the front end.

Another object of the invention is to provide an improved power take-off driven conveyor located centrally and extending longitudinally of a trailer, the same including a pair of interconnected, spaced conveyor-supporting rolls and a plurality of intermediately positioned supporting rolls, together with a two-way clutch, whereby the conveyor may be operated in a forward direction for loading the trailer, and may be operated in a rearward direction for unloading the trailer.

Another object of the invention is to provide an improved power take-off from a tractor used for pulling a trailer, said power take-off being used to drive a conveyor located centrally and longitudinally of its trailer, together with a two-way clutch, whereby the conveyor may be operated in a forward direction for loading the same, and may be operated in a rearward direction for unloading the same, said apparatus being highly efficient in operation, and relatively inexpensive to manufacture and produce.

Other objects will appear as the description proceeds.

In the accompanying drawings which form a part of this application,

Figure 1 is a view taken on the line 1—1 of Figure 2;

Figure 2 is a view taken on the line 2—2 of Figure 1;

Figure 3 is a sectional view taken on the line 3—3 of Figure 2; and

Figure 4 is a sectional view taken on the line 4—4 of Figure 2.

Like characters of reference are used throughout the following specification and the accompanying drawing to designate corresponding parts.

In carrying out the invention, there is provided a trailer having a body generally denoted by the reference numeral 1, which will include the longitudinally extending frame members 2, a floor 3 and side walls 4.

The trailer 1 will be supported upon a fifth wheel 5 on the rear end of the tractor 6, the same being supported upon the dual sets of wheels and tires 7. The rear end of the trailer 1 will be supported upon the springs 8 and upon the rear wheels 9, all of which is substantially old in the trailer art.

Positioned between the two centrally disposed longitudinal frame members 2 and extending lengthwise throughout the length of the trailer 1 is a conveyor including the forward driving roller 10 and the rear driven roller 11, the same being connected together by means of a multiple layer belt 12, and so arranged that the upper reach of the conveyor belt will extend substantially flush with the floor 3 of the trailer, but a slight distance therebelow. A plurality of transversely extending supporting rollers 13 are disposed in spaced relation beneath the upper reach of the conveyor belt 12, and also beneath the lower reach of the said conveyor belt 12 to assist in supporting the load as it is placed at the rear end of the conveyor and carried forwardly along the same to the front end of the trailer, where the load is stored or stacked.

A power take-off 14 is supported upon the tractor 6 and is connected by means of the two-way clutch 15 to a clutch-operating lever 16, pivoted at 17 intermediate its length, and connected at its outer end with a long clutch-operating rod 18 which extends the full length of the trailer, and terminates in the handle 19 at the rear end of said trailer.

The clutch 15 is connected by means of the shaft 20 with a bevel gear 21, which in turn meshes with a bevel gear 22 located on a vertically disposed shaft 23 extending through the fifth wheel and up to a point above the same and just underneath the floor of the trailer 1. A bevel gear 43 supported upon the upper end of the shaft 23 is adapted to mesh with a bevel gear 24 mounted upon the end of the transversely extending shaft 25, whose outer end supports a sprocket 26, which is connected to a sprocket 27 on the adjacent end of the forward driven roller 10 by means of the sprocket chain 28, whereby the direction of the conveyor may be controlled by merely forcing in or pulling out upon the handle 19 at the rear of the trailer, thus clutching the power take-off to operate the gears in forward or reverse motion as desired.

A tail gate 29 is hinged at 30 to the compartment 31 in which the conveyor is located, and is lowered when it is desired to use the conveyor, but is raised up and closed when the conveyor is not to be used.

The longitudinally extending ledges 32 and 33 are formed along the inner edges of the sides of the floor 3 of the trailer at the opposite sides of the conveyor, and are adapted to support a plurality of steel plates 34, which will be placed beginning at the forward end of the trailer when the trailer is being loaded, and will be laid down in the grooves toward the rear as the trailer is packed more and more toward the rear. When the trailer is being unloaded, the plates will be removed one by one as the unloading proceeds, the idea being to provide a rigid floor for the load whereby the conveyor will not be injured during the transit of the trailer from place to place.

From the foregoing description, it will be apparent that there has been devised a highly efficient form of loading and unloading means for trailers, which will be operated from a power take-off from the tractor which pulls the trailer, and said conveyor being provided with a reversible clutch whereby the direction of the conveyor may be instantaneously changed for loading or for unloading.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. In a trailer, a belt conveyor located centrally and longitudinally of said trailer, a clutch for operating the conveyor and adapted to connect with a power take-off means, oppositely disposed longitudinally extending seats formed at the opposite sides of said conveyor above the same, and removable protecting metal plates positioned between said seats to overlie said conveyor.

2. The combination of claim 1, and a compartment housing extending centrally and longitudinally and below the floor of the trailer enclosing said conveyor.

3. The combination of claim 1 wherein a pivotal tail gate is secured to said trailer for protecting said conveyor when not in use.

JOHN EDWARD HOOVER.

REFERENCES CITED

The following references are of record in the file of this patent:

UNITED STATES PATENTS

| Number | Name | Date |
|---|---|---|
| 646,671 | Vansant | Apr. 3, 1900 |
| 1,753,135 | Schuberth | Apr. 1, 1930 |
| 1,921,959 | Warren | Aug. 8, 1933 |
| 1,928,859 | Kutscha | Oct. 3, 1933 |
| 1,945,532 | Lima | Feb. 6, 1934 |
| 2,139,162 | Jenkins | Dec. 6, 1938 |
| 2,290,950 | Duncan | July 28, 1942 |
| 2,321,168 | Tognetti | June 8, 1943 |
| 2,431,000 | Step | Nov. 18, 1947 |
| 2,434,718 | Recker | Jan. 20, 1948 |